(12) United States Patent
Schertler

(10) Patent No.: US 6,550,776 B2
(45) Date of Patent: Apr. 22, 2003

(54) INTERMEDIATE METALLIC LAYER FOR FLAT PACKING AND PROCESS FOR THE PRODUCTION OF A FLAT PACKING WITH SUCH AN INTERMEDIATE LAYER

(76) Inventor: Roman Schertler, Lorenz Schertlerstrasse 18, A-6922 Wolfurt (AT)

( * ) Notice: Subject to any disclaimer, the term of this patent is extended or adjusted under 35 U.S.C. 154(b) by 0 days.

(21) Appl. No.: 09/735,833

(22) Filed: Dec. 13, 2000

(65) Prior Publication Data

US 2001/0000934 A1 May 10, 2001

Related U.S. Application Data

(62) Division of application No. 09/436,276, filed on Nov. 8, 1999, now Pat. No. 6,182,973, which is a continuation of application No. PCT/CH98/00156, filed on Apr. 22, 1998.

(30) Foreign Application Priority Data

May 16, 1997 (CH) .............................................. 1148/97

(51) Int. Cl.[7] .................................................. F16J 3/00
(52) U.S. Cl. ........................ 277/315; 277/389; 277/605; 277/387
(58) Field of Search ................................. 277/315, 389, 277/387, 391, 605, 646, 634

(56) References Cited

U.S. PATENT DOCUMENTS

| 2,987,218 A | * | 6/1961 | Erickson |
| 4,014,555 A | * | 3/1977 | Jacottet |
| 4,735,421 A | * | 4/1988 | Neef et al. |
| 5,133,561 A | * | 7/1992 | Hattori et al. |
| 5,260,642 A | * | 11/1993 | Huss |
| 5,415,729 A | * | 5/1995 | Strasser et al. |
| 5,533,736 A | * | 7/1996 | Yamaga |

* cited by examiner

*Primary Examiner*—Gary Estremsky
*Assistant Examiner*—Mark Williams

(57) ABSTRACT

A vacuum packing configuration and installation for use therewith, has a first part and a second part. The first part includes a hydraulically or pneumatically expandable, medium-tight volume adapted to be acted upon by an hydraulic or pneumatic medium, with a wall facing the second part and forming sealing faces fastened on the first part. The wall is a resilient metal diaphragm.

17 Claims, 5 Drawing Sheets

INTERMEDIATE METALLIC LAYER FOR FLAT PACKING AND PROCESS FOR THE PRODUCTION OF A FLAT PACKING WITH SUCH AN INTERMEDIATE LAYER

CROSS-REFERENCE TO RELATED APPLICATION

This is a divisional of U.S. patent application Ser. No. 09/436,276, filed Nov. 8, 1999 and now U.S. Pat. No. 6,182,973, which was a continuation application of International Application No. PCT/CH98/00156, filed Apr. 22, 1998, which claims priority on Swiss Application 1148/97, filed May 16, 1997.

FIELD AND BACKGROUND OF THE INVENTION

The present invention relates to a vacuum packing configuration comprising a pneumatically or hydraulically expandable first packing part as well as a second packing part against which the first is stressed, forming a seal.

The present invention relates furthermore to vacuum treatment installations with a stator with an interior volume substantially having the shape of a body generated by revolution, for a rotor comprising a multiplicity of workpiece holding fixtures spaced apart with respect to a rotational drive axle, with the stator comprising a multiplicity of treatment and/or transfer-through ports communicating with the interior volume for workpieces of a workpiece holding fixture, and in which, further, each of the workpiece holding fixtures driven on the rotor is directly positionable at each of the ports on the stator and in each instance a pneumatically or hydratulically actuatable packing configuration hermetically seals the workpiece holding fixture at the port against the remaining interior volume of the stator.

A vacuum packing configuration of the above described type is known from European patent application EP 0 555 764 or U.S. Pat. No. 5,415,729. It comprises a metallic bellows tube which forms a sealing structure via a part comprising a resilient material, especially intended for this purpose, such as for example a polymer such as TEFLON material (TEFLON is a trademark) or an elastomeric material, against the passive second packing part.

This provision is often disadvantageous because of the following reasons:

Often the sealing tightness required in each instance for a pressure-expanded metallic bellows having a relatively large bellows front face, is dimensionally stable only if the front face is provided with a resilient part.

The resetting force which drives it back with a pressure relief due to the spring bellows effect, is relatively low and the return position of the bellows is relatively indeterminate.

A bellows is extremely costly, if not unsuitable, for the realization of long sealing contours.

Bellows are subject to resonance phenomena during operation, which drastically reduce their service life due to the resulting, possibly high-frequency, alternating loadings.

SUMMARY OF THE INVENTION

The present invention is based on the task of improving a vacuum packing configuration of the above-mentioned type with respect to said disadvantages.

This is accomplished according to the invention in that the first part is a resilient metal diaphragm.

Consequently, the invention builds on the finding that with such a diaphragm a precisely predeterminable sealing effect, uniformly distributed everywhere, can be attained and, in the returned state, a precisely predetermined return position is established. This permits working with very small packing displacements without parts, for example, being movable during sealing relative to one another, needing to fear highly undesirable, in terms of vacuum technology, frictional contact of the packing parts with the diaphragm returned. By providing said metal diaphragm, the above described disadvantages are eliminated simply and efficiently.

Such a packing configuration, moreover, is economically simple in its structure and permits, in particular, precisely self-resetting rapid sealing cycles—also due to the precise and thus very short sealing displacements.

This permits the realization of equipment with said advantages and thus the implementation of high treatment throughputs with small overall constructional size.

The packing configuration according to the invention further permits linear and/or curved sealing contours.

By proceeding according to other features of the invention, i.e. by structuring the diaphragm such as is the case with aneroid capsules, with beads, the stress of the diaphragm through the alternating stressing is reduced.

It is further unnecessary to provide resilient formations at the sealing faces in order to achieve, reliably and uniformly distributed, the requisite sealing pressure. Other features of the invention also permit structuring of the second part of the packing configuration, at least to some extent, of metal. In this way it becomes possible to created, when establishing tightness and as a function of the sealing pressure, controlled metal/metal transitions and thus to establish thermal bridges between the parts to be sealed.

According to another feature of the invention, it can moreover be advantageous to structure at least one portion on the second part to be elastic or elastically mounted, for reasons of pulse damping, or in order to further improve the reliability of an established sealing, in particular in the case of an extensive sealing area.

The second packing part against which the active expandable part acts, can fundamentally also be active, i.e. expandable. For example, it can be structured identically to the first part or it can be passive, i.e. be sttuctured to be nonexpandable.

In EP 0 555 764 or U.S. Pat. No. 5,415,729, respectively, further, a vacuum treatment installation of the above-mentioned type is disclosed. The pneumatically or hydraulically actuatable packing parts are therein provided on the stator, while on the rotor the passive packing parts are disposed which enter with the former into the interaction forming a sealing.

While this may appear on first view to be advantageous by being able to carry the pressurization lines to the elastic packing hoses on the stator, i.e. exclusively on nonmoving housing parts, it is however known that in equipment or installations of this type, the total multiplicity of provided ports is not always equipped with treatment or transport stations, but that, depending on the treatment process to be completed one, or most often even several, of the provided ports are closed with covers so as to form a sealing. But entailed in this are relatively large expenditures in order not to damage, in the case of said not-inserted ports, the active packings provided initially. In such cases the entire provided pressure distribution system is also poorly utilized. Added to this is the fact that the pressure distribution at the individual packing configurations requires relatively long lines branched along the installation housing, with the particular relatively large line volumes having to be taken into consideration especially with rapid pressure buildup.

Under this aspect the present invention furthermore has as its object to improve substantially a vacuum treatment installation of this type. This takes place, according to other features of the invention, in that, rather than on the stator, each workpiece holding fixture on the rotor is provided with an encircling internal pressure-expandable packing part which is connected to the rotor by a pressurization line arrangement.

Furthermore, the active expandable packing parts on the installation according to the cited EP 0 555 764 are elastic packing hoses. In particular for highly pure treatment processes to be carried out, these are disadvantageous with respect to gas, diffusion and gas absorption (degradation of vacuum), with respect to thermal loadability and their service life. They are, furthermore, if at all, only undefined, application time-dependent, self-resetting as a function of temperature, which does not allow for rapid sealing cycles utilizing self-resetting. With respect to alternating pressure stressing, they act like lowpass filters.

These disadvantages are solved with the installation according to other characterizing features of the invention.

An installation combining various features of the invention is also proposed, which has combined advantages.

Preferred embodiments of the vacuum treatment installation are specified. A highly preferred embodiment uses the vacuum treatment configurations of the installation, in particular at the rotor side, that is structured as a diaphragm with all described advantages of this configuration.

BRIEF DESCRIPTION OF THE DRAWINGS

In the following the invention will be explained by example in conjunction with drawings, wherein.

DESCRIPTION OF THE PREFERRED EMBODIMENTS

Figure 1:
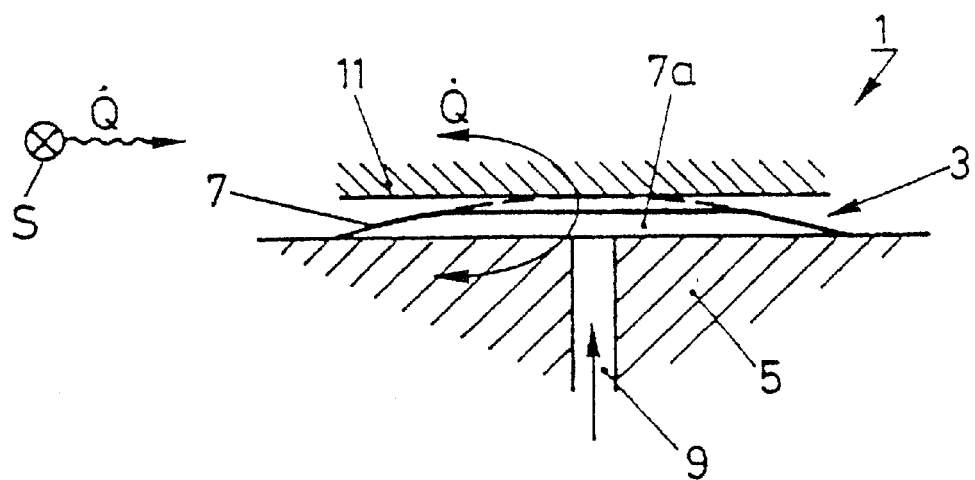
FIG. 1 is a schematic cross sectional view of a prototypical variant of a vacuum packing configuration according to the invention.

According to FIG. 1 a packing configuration 1 according to the invention comprises a controlled or active part 3 which is formed by a metal diaphragm 7 forming on all sides a sealing connected with one of the installation parts 5. In the hollow volume 7$a$ formed between the metal diaphragm 7 and associated installation or equipment part 5, a pressurization line 9 for a gaseous or potentially liquid actuation medium, terminates. Upon being pressurized, the diaphragm 7 is stepped up resiliently over a relatively small displacement (shown in dashed lines) and comes into intimate contact on the installation part 11 to be sealingly connected with part 5. The diaphragm 7, structured substantially as a metal spring, under pressure relief due to its resilient properties flexes back into the precisely predetermined resting position. If the installation part 11, and in particular the portion of this part against which the diaphragm 7 is pressed when tightness is being established, is a metallic part, then under control a thermal bridge or a thermal shortcircuit develops as indicated by the double arrow Q wherein in particular also the thermal conductivity of the actuating medium placed under pressure from line 9—in this case preferably a liquid medium—must also be taken into consideration. Thereby, apart from the creation of the tightness, specifically and depending on the direction of the temperature gradient obtaining between parts 5 and 11, a thermal flux connection is established. Therewith it is possible, if, as shown schematically in FIG. 1, a heat source S is located on one side of the packing configuration 1, for example on part 11, to divert the thermal flux onto part 5 in order to prevent that critical heat portion flow off on the installation part 11, according to FIG. 1 toward the right: a thermal shortcircuit is established under control.

Figure 5:
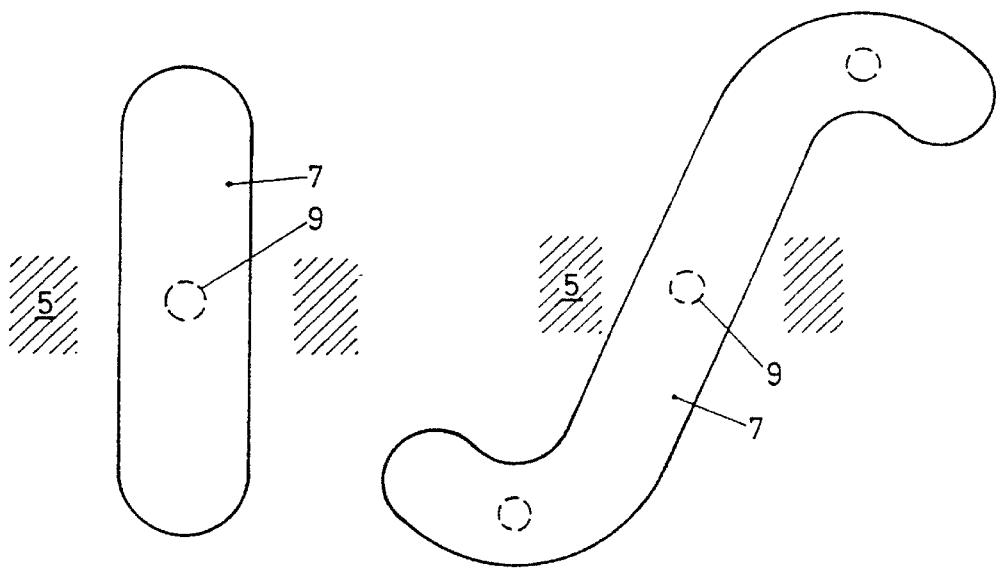
FIGS. 5($a$), 5($b$), 5($c$) and 5($d$) are respective top plan views of possible forms of the packing configuration according to the invention.
Figure 5:
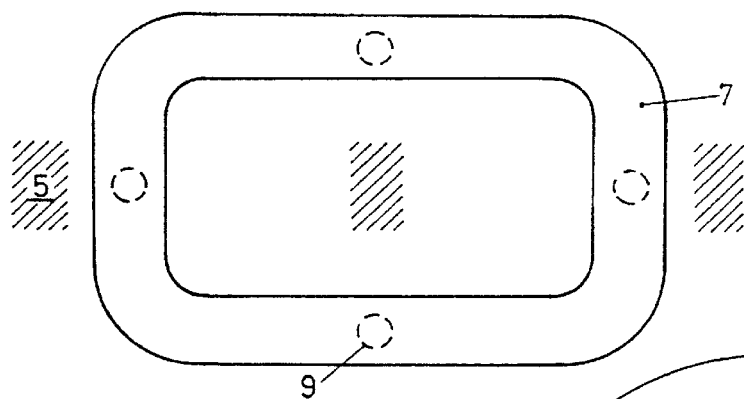
Figure 5:
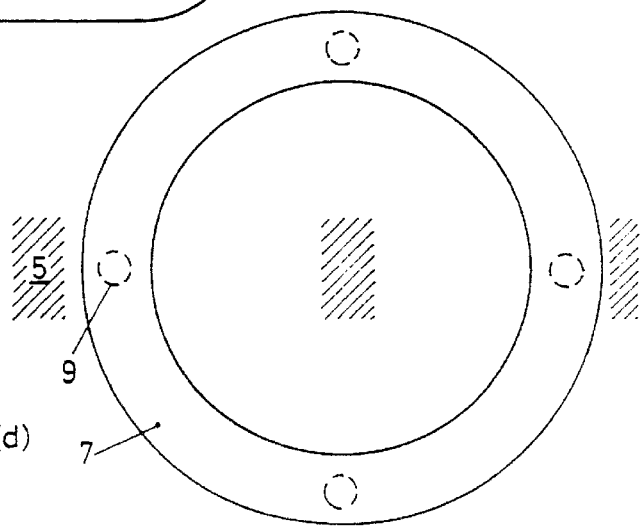

The packing configuration according to the invention according to FIG. 1 can be carried along long contours to be sealed of virtually any shape as will become evident in particular in connection with the description of a preferred embodiment example of the installation according to the invention and as is represented by example in FIGS. 5($a$) to 5($d$).

Figure 2:
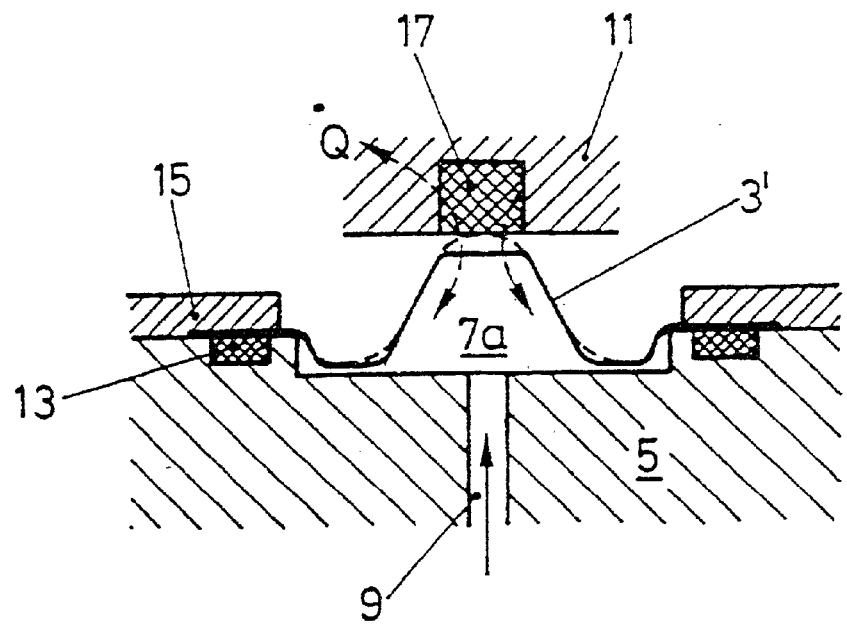
FIG. 2 is a view similar to FIG. 1 and building on the representation of FIG. 1, of a preferred embodiment of the vacuum packing configuration.
Figure 3:
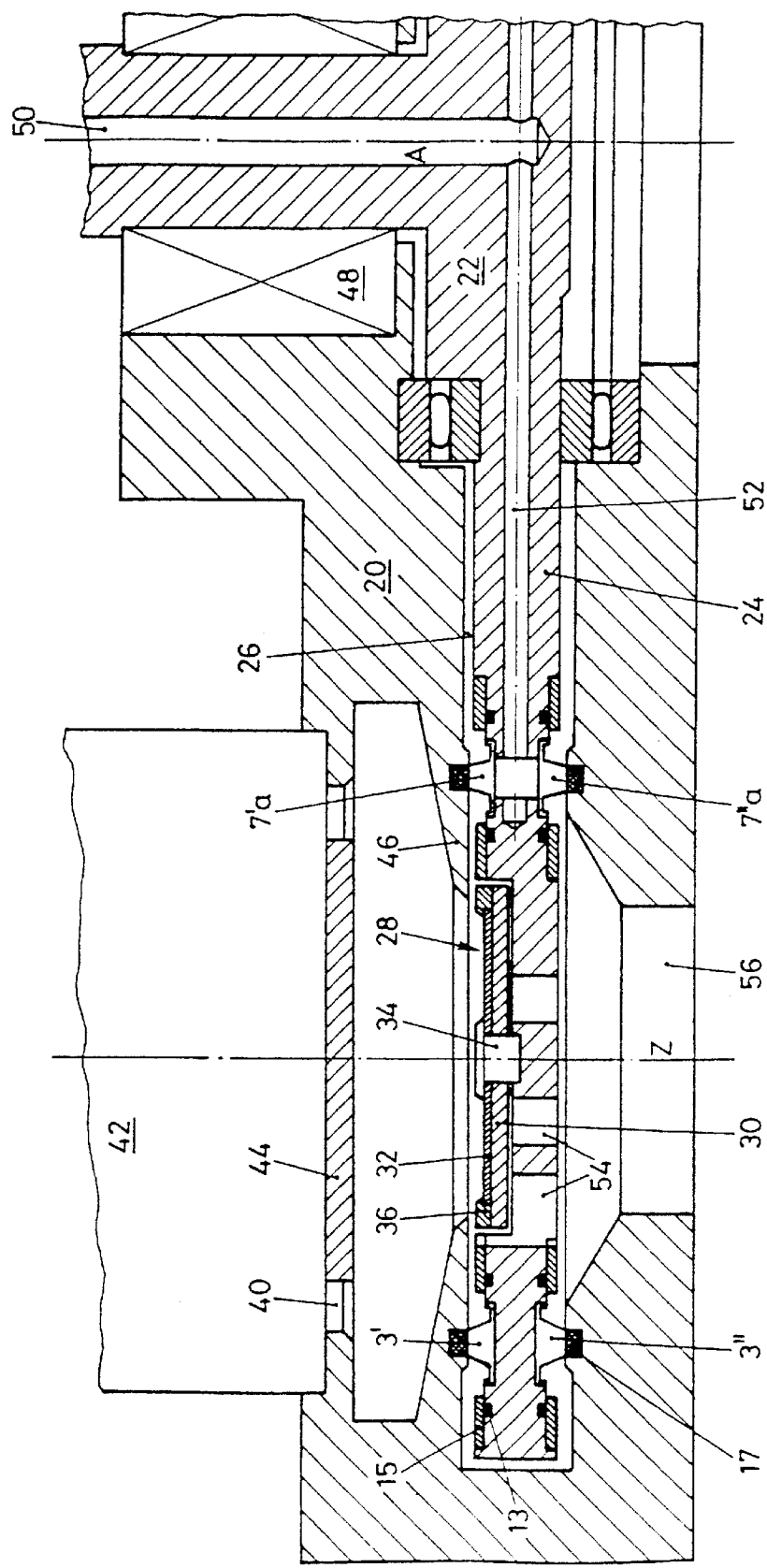
FIG. 3 is a longitudinal section through a preferred embodiment of a vacuum treatment installation according to the invention.

FIG. 2 shows a preferred embodiment of the packing configuration according to the invention. Substantially the same reference symbols as in FIG. 1 are used. The metal diaphragm 3' is here structured substantially in the form of a W. The limbs of the W are laterally bent out and the W bends are each U-shaped. Upon pressurization through line 9, and in contrast to a bellows, due to slight changes of the curvature in the W cross section shape, the membrane is placed intimately in contact on installation part 11. FIG. 3 also shows, by example, the way in which the lateral tightness of the pressure volume 7$a$ disposed underneath the diaphragm 3' is established, namely by means of elastic packings 13, against which the diaphragm 3' is clamped by means of clamping elements 15.

FIG. 2 further shows, as a alternative, to provide on installation part 11 and its sealing region at least over a limited segment an elastic packing 17, but to leave open laterally the possibility to establish, according to the explanations in this respect in connection with FIG. 1, actively controlled thermal bridges Q.

Figure 4:
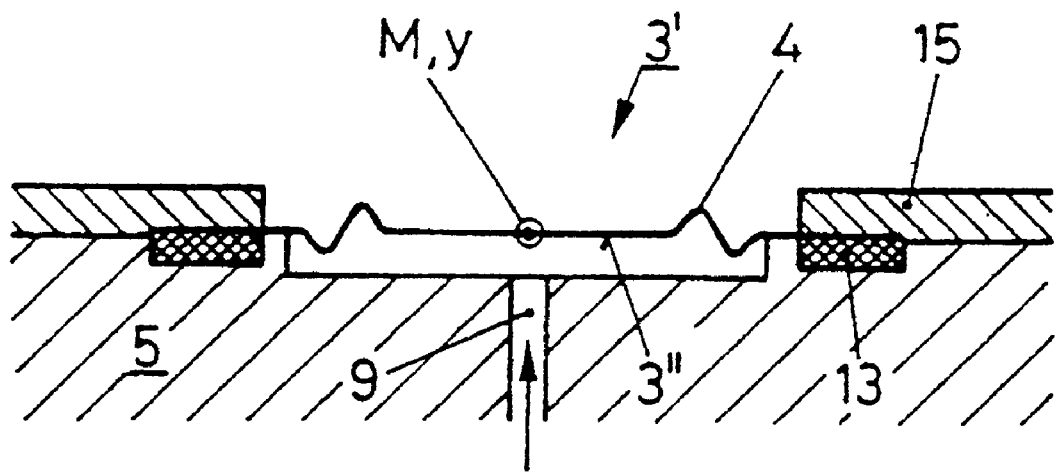
FIG. 4 is a sectional view of the packing configuration according to the invention in a further embodiment.

In FIG. 4, a further embodiment of the diaphragm 3' is provided, similar to aneroid capsules, with beads 4 and specifically disposed symmetrically to a diaphragm center, M or a diaphragm center axis y.

Figure 8:
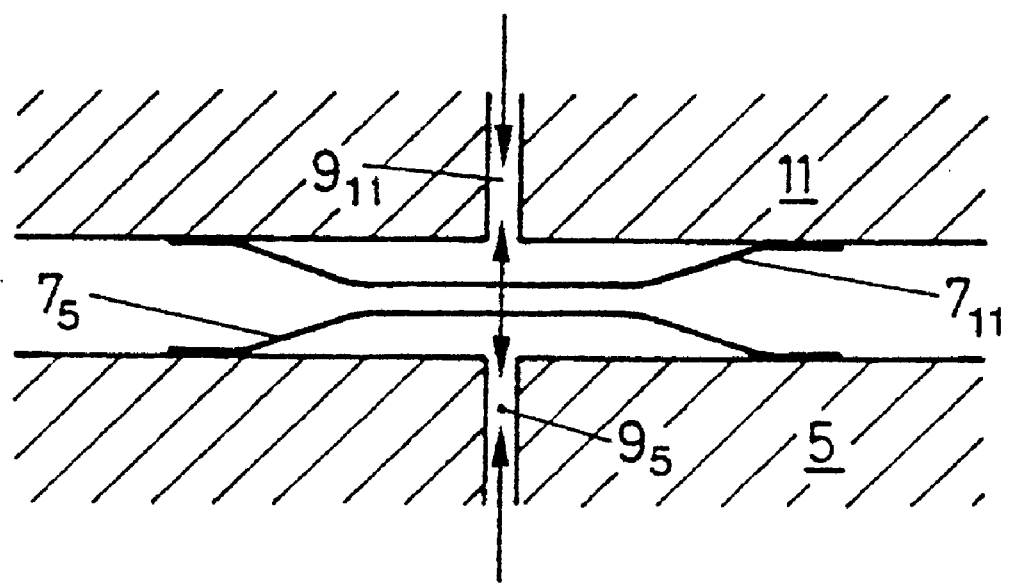
FIG. 8 a is a sectional view of a further embodiment of a packing configuration according to the invention.

Building on the configuration according to FIG. 1, lastly, FIG. 8 depicts a packing configuration according to the invention in which two diaphragms $7_{11}$ and $7_5$ enter under control into interaction with each other for sealing.

FIG. 3 depicts, in simplified form and in longitudinal section, a vacuum treatment installation according to the invention in a preferred embodiment. It comprises a stator 20, wherein a rotor 22 with rotor axis A revolves while being driven. The rotor 22 comprises a disk-shaped cantilever 24. On the one front face 26 of the rotor disk 24 are distributively provided several workpiece holding fixtures 28, as shown by example, formed by receiver plates 30 each for disk-shaped workpieces 32, for example each with a center hole and with, such as is for example, known for CD working, a center mask 34 and a peripheral mask 36. Several ports 40 are provided on the stator 20, aligned radially with the provided workpiece holding fixtures 28 on rotor 22. On at least a portion of these ports 40, working stations and/or locks or transfer stations 42 are flanged on (e.g. connected by flanges to each other). In FIG. 3 a sputtering station with target 44 and screen 46 is shown.

Numeral 48 schematically denotes the driving motor for rotor 22. About each of the workpiece holding fixtures 28 an encircling packing metal diaphragm 3' is structured according to FIG. 2, on rotor 22, which diaphragm as shown in FIG. 2, is clamped tightly with lateral elastic packing rings 13 and clamping rings 15.

Opposing the packing diaphragms 3' associated with the workpiece holding fixtures, and further preferred, a further annularly encircling packing diaphragm 3" is provided on the stator disk 24, which diaphragm is structured and mounted according to the explanations in connection with FIG. 2. Also following the explanations in connection with FIG. 2, each of the packing diaphragms 3' and 3" act partially on metallic counter faces on stator 20, partially on elastic packing parts 17.

Coaxially with the rotational axis A of the rotor 22 a pressure line 50 leads up to the level of the rotor disk 24, where, radially toward the outside, pressure distribution lines 52 terminate in the pressure volumes 7'a, 7"a of the packing diaphragms 3' and 3".

By pressurization of the trunk line 50 and thus the particular distribution branch lines 52 the sealings 3', 3" with respect to the stator 20 are established simultaneously on the particular workpiece holding fixtures 28 on both sides of the rotor disk 24, which prevents any bending strain of the rotor plate 24. In terms of vacuum technique a self-contained volume is created from port 40 via ports 54 through the disks 24 to the backside of disk 24 and to a particular further flange-type port 56 in stator 20 such that by flanging a pump onto the port 56 the particular necessary treatment pressure for the workpieces can be generated, partitioned off from the remaining volume between stator 20 and rotor 22. This allows a compact construction for the installation.

Due to the metal/metal contacts between the metal packing diaphragms 3', 3" and stator 20 further a thermally insulated center zone on the part of the workpiece holding fixtures 28 is created.

According to FIG. 3 the workpiece holding fixtures 28 are each disposed on the one side of the rotor disk 24. In this embodiment of the installation the workpiece holding fixtures 28, and thus in particular the workpieces 32, are kept stationary during their treatment on the station 42 shown by example. Opposing the port 40 across the rotor disk 24, a further port 56 is provided in stator 20, on which, should the process at station 42 require it, a vacuum pump is connected which, otherwise, is closed and sealed by means of a cover. Passage ports 54 in the rotor disk 24 permit the pumping action penetration of port 56 into the port region 40, and thus, into the treatment station 42. Due to the packings 3" provided according to the invention, a vacuum-technique partitioned volume is created across port 56, workpiece holding fixture 28, port 40 and treatment station 42.

Figure 6:
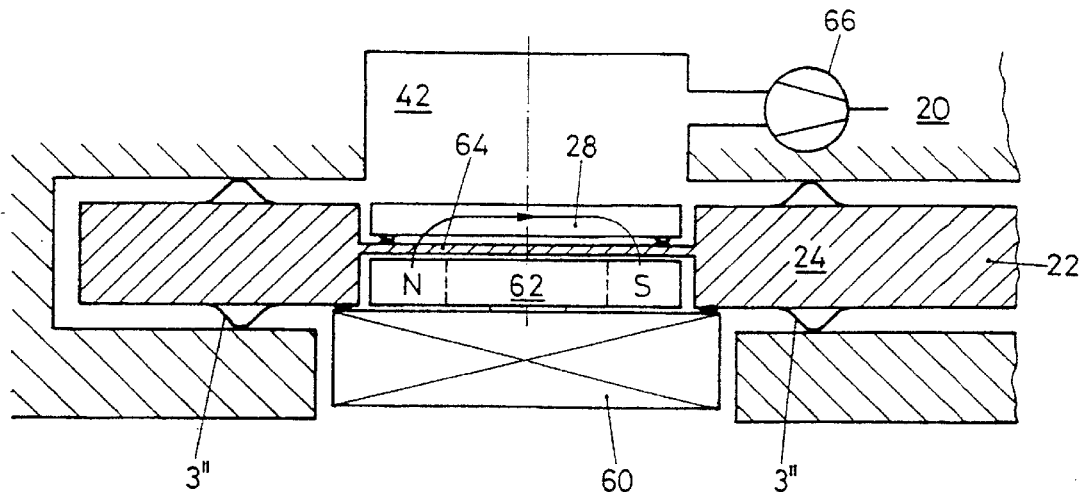
FIG. 6 is a schematic sectional view of a driving configuration for the workpiece holding fixture on the installation according to FIG. 3.

It is in specific cases desirable to allow the positioned workpiece 32, as shown in FIG. 3, to rotate on the workpiece holding fixture 28 during the treatment by means of station 42. A drive preferably provided for this purpose is shown schematically in FIG. 6, with nonessential- parts-with respect to the drive being omitted in this figure for reasons of clarity. In this embodiment on the rotor disk 24 with the schematically shown packings 3", a driving motor 6 is flanged on and extends with a driving rotor 62 magnetically through a separating wall 64 on the rotor disk 24 onto the workpiece holding fixture 28 rotatably supported on disk 24. On rotor 62 and/or on the workpiece holding fixture 28 magnets, preferably permanent magnets, are disposed. As shown schematically in FIG. 6, in this embodiment variant a vacuum pump 66 is provided on stator 20 and on the same side as the stations 42 with respect to disk 24.

In this embodiment the driving motor 60, fixedly associated with the particular workpiece holding fixture 28, revolves with the rotor 22. It is understood that it is entirely possible to provide the driving motor 60 stationarily on stator 20 and to realize the magnetic action penetration of the driving rotor 62 onto the workpiece holding fixture 28 only if the latter has been rotated by means of the disk 24 into alignment toward station 42 and the stationary driving motor 60/62. This type of rotational workpiece driving is used in FIG. 7 and, even in the embodiment according to FIG. 7, the driving motors 60a to 60c provided here and fixedly associated with the particular workpiece holding fixtures 28, can be mounted on rotor 22.

Figure 7:
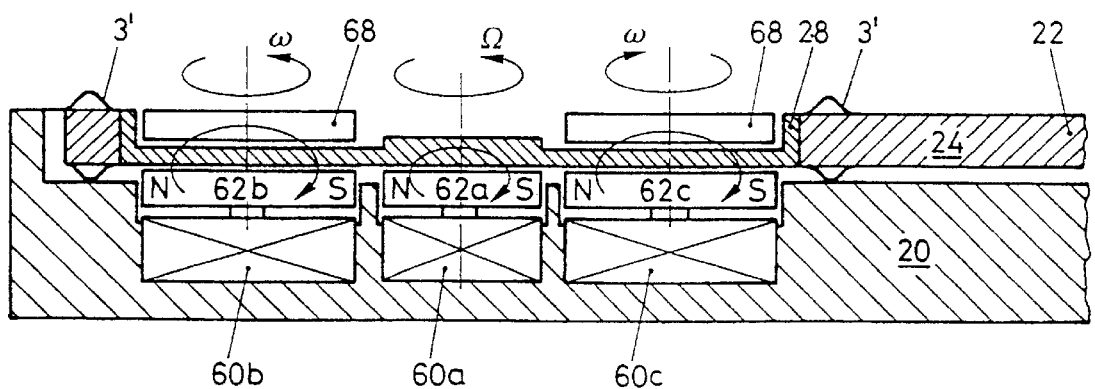
FIG. 7 is a schematic sectional view of the driving configuration according to FIG. 6, further developed for an installation in principle according to FIG. 3, in which the workpiece holding fixtures comprise at least workpiece holders for two workpieces.

As is readily evident in FIG. 3 in which a workpiece holding fixture 28 for a workpiece 32 is shown, the workpiece holding fixtures 28 can perfectly well hold two or more workpieces which, in this case, are transported and treated simultaneously. In FIG. 7 a portion of a corresponding installation is shown schematically, in which the workpiece holding fixture 28 comprises at least two workpiece holders 68 pivotably supported on the workpiece holding fixture 28. The workpiece holding fixture 28 itself is also pivotably supported with respect to the rotor disk 24 with the corresponding bearings not being shown. For reasons of clarity, in this figure only the arrangements provided for driving workpiece holding fixture 28 and workpiece holders 68 are shown schematically. As already discussed as second possibility in connection with FIG. 6, here on stator 20, and aligned toward a particular, not shown here, treatment station 42, a driving motor 60a as well as at least two driving motors 60b or 60c are provided. Each motor 60a, 60b and 60c comprises an associated driving rotor 62a, 62b and 62c.

After a corresponding workpiece holding fixture 28 has been rotated into treatment position by rotational movement of rotor 22, the driving rotors 62 exert magnetically penetrating action, on the one hand, onto the workpiece holders 68, on the other hand, onto the workpiece holding fixture 28 itself. As is the case with respect to action penetration of the driving rotor 62a onto the workpiece holding fixture 28 shown in FIG. 7, this can take place directly or, and preferably, via a separating wall analogous to the separating wall 64 of FIG. 6 on the rotor disk 24.

Therewith workpiece holding fixture 28 and the thereto related planets 68, namely the workpiece holders, are offset corresponding to $\Omega$ or $\omega$ in revolutions drivable independently of one another.

Fundamentally, through the realization of a rotational movement of the workpieces during their treatment a deviation, potentially conditional through constructional tolerances, of the center axis of the treatment station 42 or its effect and of the workpiece center is compensated, which, in particular in the simultaneous treatment of, in this case, workpieces, according to FIG. 7, disposed eccentrically by necessity, is necessary if a highly homogeneous treatment effect along the workpiece surface is of great importance.

In the construction of the installation according to FIG. 7 pumping down also takes place on the same side of the rotor disk 24 on which the treatment stations are disposed.

Looking back on FIG. 3, it is in particular readily apparent that workpiece holding fixtures 28 can also be disposed on both sides of the rotor disk 24 and, in this case, on both sides on the stator the corresponding ports 40 to bilaterally disposed treatment stations 42 are provided. This yields the possibility of virtually doubling the throughput of the installation.

With the depicted and explained installation according to the invention, thus, apart from optimum sealing conditions which permit the vacuum-technique partitioning of the particular treatment zones, a high degree of application flexibility is attained thereby that, for example, by means of exchangeable workpiece holding fixtures 28 individual relatively large workpiece disk or several smaller ones on one or both sides of the rotor disk 24 can be worked simultaneously.

The installation according to the invention is especially suitable for the manufacturing treatment of the following workpieces: silicon wafers, storage disks, such as hard disks or CDs, therein preferably for optical rewritable storage disks and further, fundamentally, for workpiece surface treatments which require several vacuum processes, in particular for workpieces coated with several layers. This is primarily given by the fact that the installations make possible a highly reliable vacuum-technique separation of treatment zones from the remaining hollow installation volumes, also of the particular treatment zones from each other, and, in addition, due to the short cycle times possible due to the structure of the installation, a high throughput, which is attained in a simple manner and thus highly economically.

While specific embodiments of the invention have been shown and described in detail to illustrate the application of the principles of the invention, it will be understood that the invention may be embodied otherwise without departing from such principles.

What is claimed is:

1. A method for producing a disk-shaped workpiece by performing a vacuum treatment, comprising the steps of:
   providing a vacuum treatment station with a treatment opening in a wall of the station;
   placing a workpiece adjacent said opening and separate from said opening and from said wall by an interspace;
   controllably and sealingly closing said interspace around said workpiece by using a source of pressure medium for expanding a resilient sealing member in said interspace and around said workpiece and said opening;
   said sealing member having a resilient metal diaphragm;
   providing resiliency of said metal diaphragm by means of resilient beads along said diaphragm; and
   expanding said resilient metal diaphragm so as to create a vacuum treatment space between said source and said workpiece.

2. The method of claim 1, further comprising the step of placing said workpiece adjacent said opening by means of a rotor with a workpiece carrier being controllably driven around a rotor axis.

3. The method of claim 1, further comprising the steps of providing more than one vacuum treatment station each respectively with a treatment opening in a respective wall thereof, and placing workpieces subsequently adjacent said respective openings and separate from respective opening by respective interspaces, controllably and sealing by closing said interspaces around said workpieces by selectively using pressure medium sources for expanding resilient sealing members in said respective interspaces and around said respective workpieces and said respective openings, by expanding resilient metal diaphragms of said sealing members so as to selectively create vacuum treatment spaces between said sources and said workpieces.

4. The method of claim 1, further comprising drivingly rotating said workpiece relative to said source after said closing step.

5. The method of claim 4, further comprising the step of performing said rotating by means of magnetic-field-coupling a magnetic workpiece carrier to a rotating magnet arrangement.

6. The method of claim 1, further comprising the step of performing said closing by expanding said resilient metal diaphragm to be biased toward and onto an elastic member.

7. The method of claim 1 for producing silicon-wafer-based workpieces.

8. The method of claim 1 for producing storage disks.

9. The method of claim 8 for producing hard disks or CD's.

10. The method of claim 1 for producing optical rewritable storage disks.

11. The method of claim 1 for producing multiple-vacuum coated workpieces.

12. The method of claim 1, including expanding the diaphragm into a band having a plane that is linear or curved.

13. The method of claim 1, including providing the beads to be disposed symmetrically with respect to a center of symmetry or an axis of symmetry of the diaphragm.

14. The method of claim 1, including expanding the diaphragm against a part that is made of metal.

15. The method of claim 1, including expanding the diaphragm against a part that is elastic.

16. The method of claim 1, including providing the diaphragm to have a cross section that is substantially W-shaped or M-shaped with laterally bent-off side limbs and U-shaped bends defining the beads.

17. The method of claim 1, including providing the workpiece to be one of: an Si wafer, a hard disk, a CD, and an optical rewritable storage disk; the workpiece being treated by means of any vacuum processes for coating the workpiece with layers.

* * * * *